United States Patent [19]

Okada et al.

[11] 4,166,641
[45] Sep. 4, 1979

[54] INFLATOR FOR SAFETY AIR BAG IN AN AUTOMOTIVE VEHICLE

[75] Inventors: Motohiro Okada, Asaka; Taiji Ohmori, Kawagoe, both of Japan

[73] Assignee: Honda Giken Kogyo Kabushiki Kaisha, Tokyo, Japan

[21] Appl. No.: 826,045

[22] Filed: Aug. 19, 1977

[30] Foreign Application Priority Data

Aug. 24, 1976 [JP] Japan .................. 51-100781

[51] Int. Cl.$^2$ ............................................. B60R 21/08
[52] U.S. Cl. ..................................... 280/735; 180/282
[58] Field of Search ............................. 280/734, 735; 180/103 A

[56] References Cited

U.S. PATENT DOCUMENTS

| | | | |
|---|---|---|---|
| 3,552,769 | 1/1971 | Kemmerer | 280/734 |
| 3,735,398 | 5/1973 | Ross | 280/735 X |
| 3,750,100 | 7/1973 | Ueda | 280/735 X |
| 3,765,699 | 10/1973 | Marquardt | 280/735 |
| 3,774,714 | 11/1973 | Usui | 280/735 X |
| 3,848,695 | 11/1974 | Lacaze | 280/735 X |

*Primary Examiner*—John P. Silverstrim
*Attorney, Agent, or Firm*—Polster, Polster and Lucchesi

[57] ABSTRACT

An inflating device for safety air bag for an automotive vehicle is basically constructed with an air bag inflating implement, a first sensor which is installed in the neighborhood of the vehicle cabin and generates an actuating signal when a change in the running speed of the vehicle within a sampling time exceeds a predetermined value, a second sensor which is provided in a position forward of the first sensor and which detects the change in the vehicle speed at the initial stage of the collision, a third sensor which is provided within the vehicle cabin, the third sensor having no sampling time relative to a predetermined speed reduction value in the vehicle, and a memory device which is composed of an electronic circuit or mechano-electric components, in which construction the actuating signal is made to be applied to the air bag inflating implement when output signals are generated from the memory device and the first sensor simultaneously.

1 Claim, 8 Drawing Figures

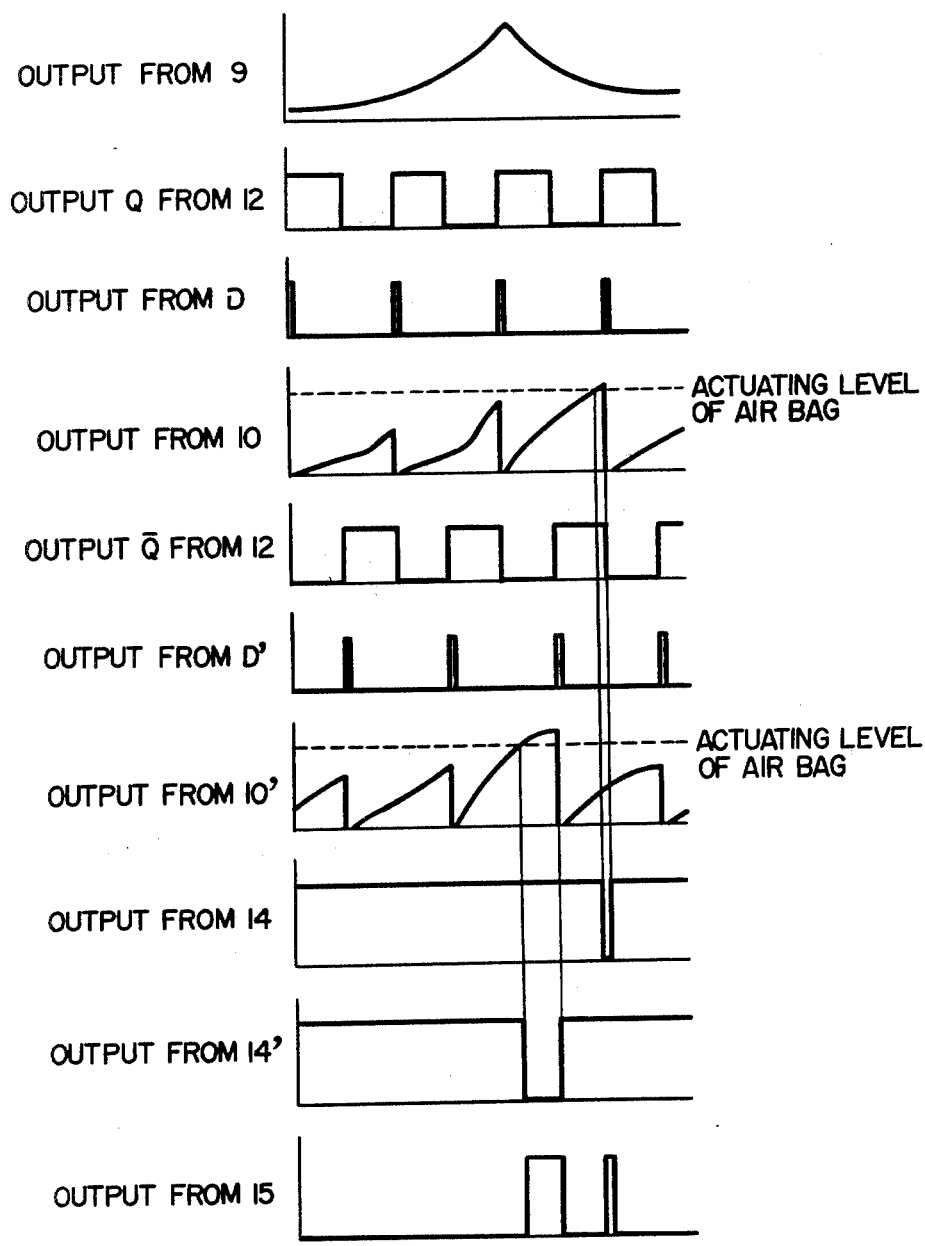

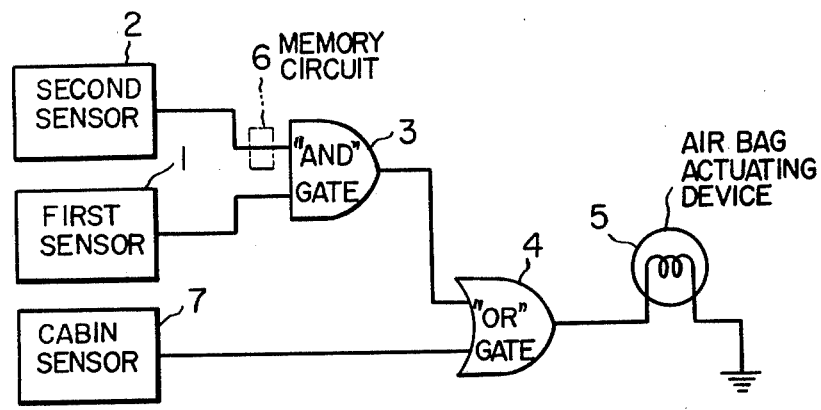
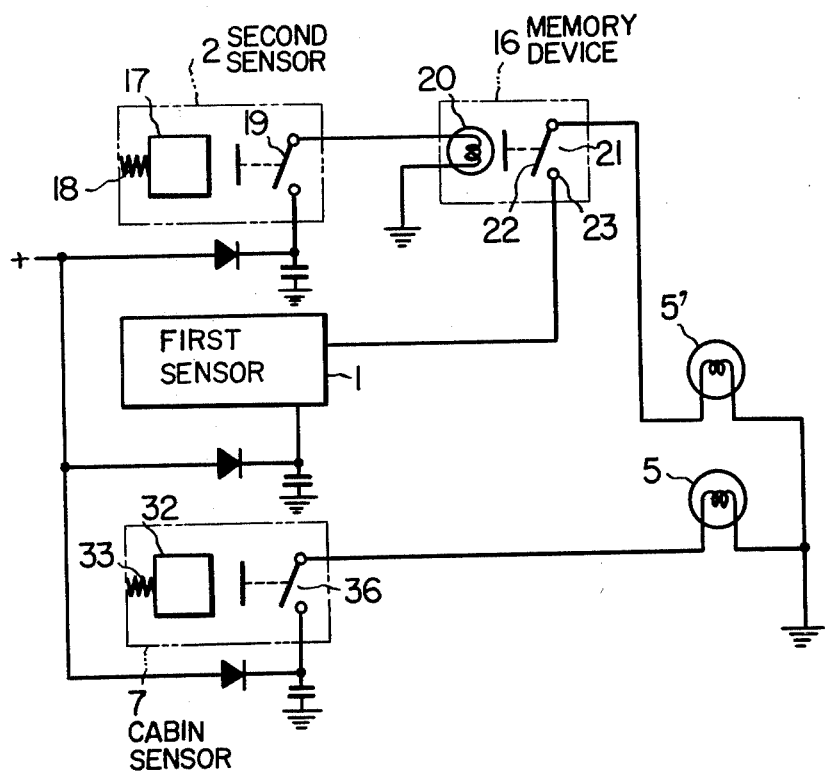

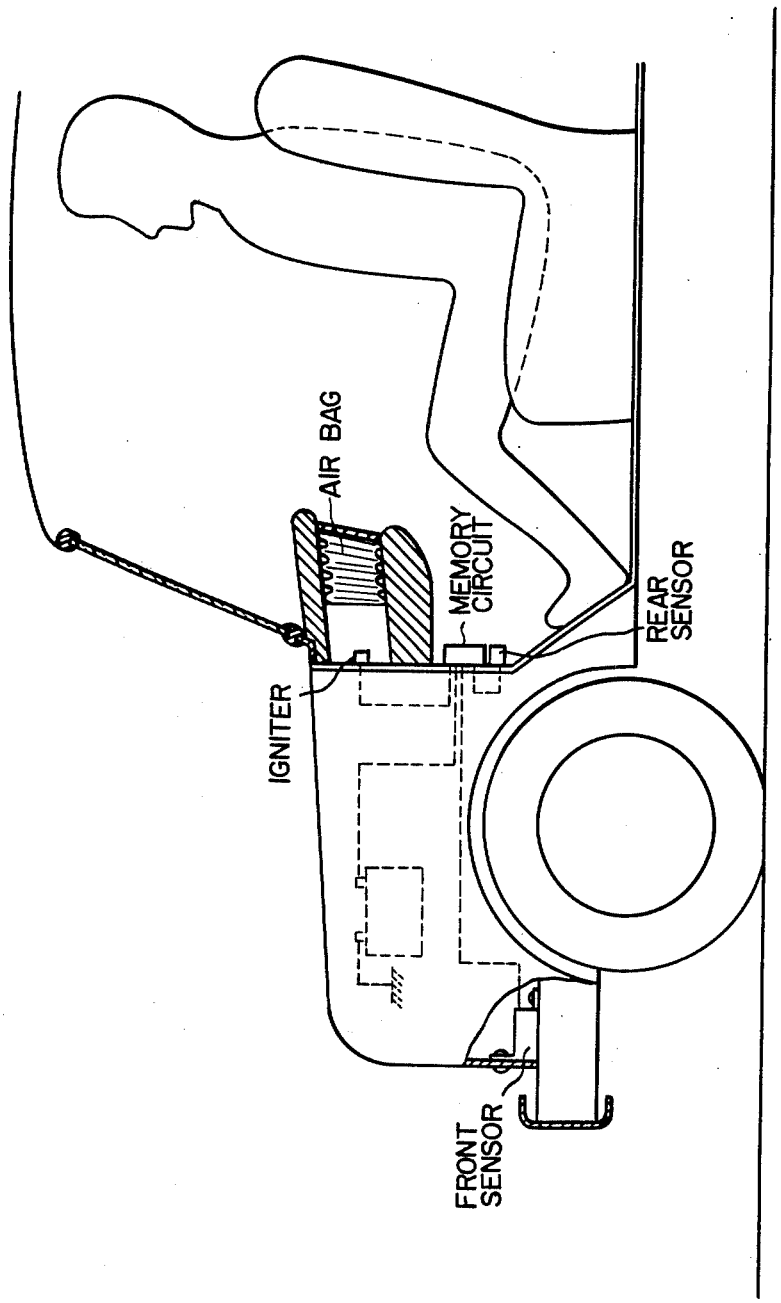

INFLATOR FOR SAFETY AIR BAG IN AN AUTOMOTIVE VEHICLE

BACKGROUND OF THE INVENTION

The present invention relates to a safety air bag or cushion which serves to protect a rider or riders in a automotive vehicle from unexpected danger of injury or death at the time of collision of the vehicle. More particularly, the invention is concerned with an inflating device for such safety air bag adapted to be installed in a small-sized automotive vehicle.

In view of the possible injury to, or danger of erroneous steering operation by, the vehicle rider due to its abrupt or sudden expansion or inflation, the safety air bag should be of such a type that it will not be actuated for inflation at a collision speed of the automobile vehicle below that which is likely to result in injury to the rider if no air bag is provided.

At the present level of technology, the inflating device for the safety air bag is so constructed that it may be actuated to expand the safety air bag when slowing-down in the vehicle running speed to approximately 25 km/h or so will take place in a time instant of approximately 150 m.sec. or shorter. (This reduction in the vehicle running speed will hereinafter be called "speed reduction value $V_{RS}$".) The reason for this setting of the speed reduction value $V_{RS}$ is due to the fact that the capability of the energy-absorbing type front window glass, steering handle, gauge panel, and various other equipments in the automotive vehicle to protect the vehicle riders from unexpected injury or death at the time of collision of the vehicle is limited to this extent of the speed reduction at the present level of the technology.

In large-sized vehicles, such safety system has already been put into practice by installing in the vehicle cabin a detection device to detect an abrupt reduction in its running speed so that, when the detected value has reached the abovementioned speed reduction value $V_{RS}$, an instruction may be given to the safety air bag expanding mechanism to inflate or balloon the same. However, since the small-sized vehicle has no spacious front cabin compartment for the vehicle occupant, if an instruction signal is sent to the inflating device for the safety air bag to be actuated only after the speed change in the vehicle has reached a value corresponding to the speed reduction value $V_{RS}$, the vehicle rider will meet with the safety air bag before it is completely inflated, and such premature inflation cannot at all exhibit satisfactory life saving capability.

As the measures for such premature inflation of the safety air bag, if a seismometric weight type sensor is provided at the front end part of the vehicle, an actuating signal for the air bag inflation can be emitted almost simultaneously with the collision. However, this sensing device is so sensitive that it can easily detect a very slight shock of collision and emit a signal when an object of even a small mass collides against the vehicle at a high speed with the result that the safety air bag is disadvantageously actuated when it is not required to be inflated.

In other words, this front sensor tends to operate erroneously, while the cabin sensor brings about delay in the operation, when installed in the small-sized car. As the consequence, it is not possible to solve the abovementioned various points of problem even by arranging these two sensors, i.e., front and cabin, either in series or in parallel.

SUMMARY OF THE INVENTION

In view of the above-mentioned disadvantages in the heretofore known device for inflating the safety air bag for automotive vehicles, it is a primary object of the present invention to provide an improved safety air bag inflating device which can be actuated at an optimum timing and a predetermined reduction in the running speed of the vehicle when it is collided against an object.

It is another object of the present invention to provide an improved safety air bag inflating device of a type, in which a pair of sensors are provided in the safety air bag actuating mechanism, one at a location in the vicinity of the vehicle cabin, and the other at the front end part of the vehicle so that an actuating signal may be emitted to the inflating device, when a sampling time of the sensor in the vicinity of the vehicle cabin exceeds a certain set value of reduction in the vehicle running speed immediately after the collision takes place.

According to the present invention, in one aspect thereof, there is provided a device for inflating a safety air bag in a small-sized automotive vehicle which comprises in combination: air bag actuating means; first sensor means which is installed in the vicinity of a cabin of the automotive vehicle, and which generates an actuating signal when a change in the running speed of the vehicle within a sampling time exceeds a predetermined value, the sampling time being the maximum delay in detection permitted to the sensor means to impart the actuating signal to the air bag after the vehicle collision takes place so that the safety air bag may exhibit satisfactory performance to protect vehicle riders from unexpected danger of accident; and second sensor means which is installed in a position forward of the first sensor means, and which detects the change in the vehicle speed at the initial stage of the collision, the actuating signal being applied to the air bag actuating means when output signals are generated from the first and second sensor means simultaneously.

According to the present invention, in another aspect thereof, there is provided a device for inflating safety air bag in a small-sized automotive vehicle which comprises in combination: air bag actuating means; first sensor means which is installed in the vicinity of a cabin of the automotive vehicle, and which generates an actuating signal when a change in the running speed of the vehicle within a sampling time exceeds a predetermined value, the sampling time being the maximum delay in detection permitted to the sensor means to impart the actuating signal to the air bag actuating means after the vehicle collision takes place so that the safety air bag may exhibit satisfactory performance to protect vehicle riders from unexpected danger of accident; second sensor means which is installed in the forward position of the first sensor means, and which detects the change in the vehicle speed at the initial stage of the collision, and memory means to store therein an output from said second sensor means, the actuating signal being applied to the air bag actuating means when output signals are generated from the memory means and first sensor means simultaneously.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE ACCOMPANYING DRAWINGS

Specific embodiments of the present invention have been chosen for the purposes of illustration and description, and are shown in the accompanying drawings, forming a part of the specification, in which:

FIG. 2 shows waveforms of output signals from various parts of the circuit system of the first sensor shown in FIG. 1;

FIG. 4 is a block diagram showing one embodiment of the inflating device for safety air bag according to the present invention;

FIG. 5 is also a block diagram showing another embodiment of the inflating device for safety air bag according to the present invention;

FIG. 8 is a fragmentary sectional view of an automotive vehicle with the safety air bag device installed.

DESCRIPTION OF PREFERRED EMBODIMENTS

Figure 1:
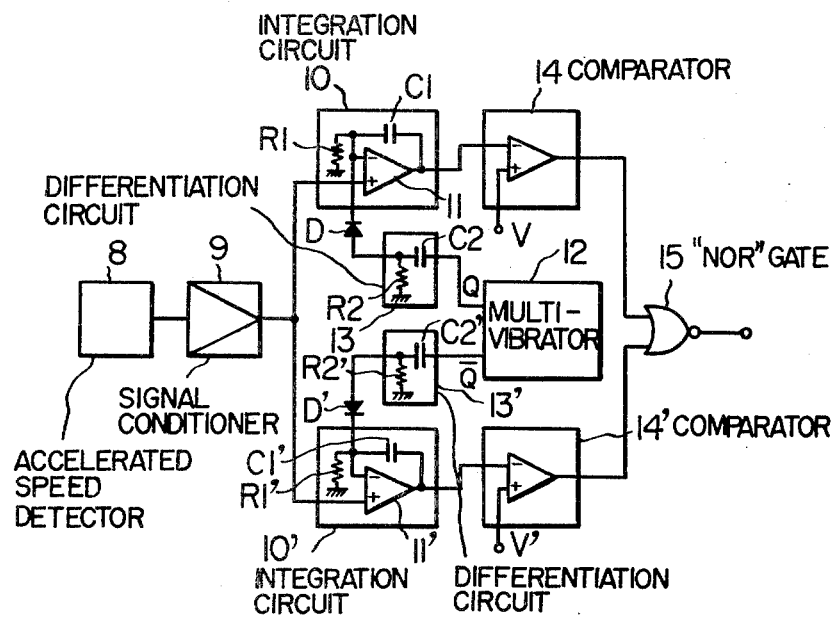
FIG. 1 is a block diagram showing one embodiment of a first sensor to be installed in the inflating device for the safety air bag according to the present invention.

Referring to FIG. 8 to illustrate the environment for the system of this invention, in this embodiment, a front sensor, which is also described hereinafter as a second sensor, is mounted near the front bumper of an automobile, while a rear or cabin sensor is mounted in the cabin. An air bag is mounted in the dash, and an igniter is positioned to inflate the air bag in a short space of time. The various elements of the electrical system are described in more detail hereinafter.

To begin with, the above-described seismometric weight type sensor is, primarily, capable of detecting an abrupt speed change at the time of collision, in which the abrupt speed change ($V_F$) at the front end part of the vehicle substantially coincides with the collision speed. However, a speed change ($V_R$) to occur in the vehicle cabin increases or decreases in relation to not only the collision speed, but also the mass of an object, against which the vehicle is collided. Consequently, when a sensor for detecting the above-mentioned abrupt speed change $V_F$ is used, a switch for actuating the air bag actuating mechanism is turned "on" readily when even the object of a small dimension at a high speed hits against the vehicle. For instance, a bumper having a capability of withstanding an impact force exerted by a vehicle running speed of upto 8 km/h without causing any damage thereto is fixed on the front end part of an automotive vehicle of 800 kg in weight, and then, a sensor of $V_{FS}=25$km/h, i.e., a sensor which arrives at its critical detection point when a vehicle is caused to collide against a barrier (a flat surfaced concrete wall having a sufficiently large mass with respect to the vehicle to be collided thereagainst) is fitted onto this bumper. Then, when an iron ingot having a mass of 60 kN (approximately 6 kg) is caused to collide against the vehicle running at a closing speed of 100 km/h (approximately 60 mph), a relationship between the stroke of the weight within the sensor and the time lapse is such that the switch is turned "on" in only 2 m.sec. of a time instant, in which case the speed change $V_R$ within the vehicle cabin is only 0.5 km/h, which amounts to 2% of the speed reduction value $V_{RS}$. This can be tabulated in the following Table.

TABLE

| Mode of Collision No. | Colliding Object | | | Speed Change | | Necessity for Safety Cushion |
|---|---|---|---|---|---|---|
| | Mass | Size | Position of Collision | Closing Speed ($V_c$) | Front (bumper) ($V_F$) | Cabin ($V_R$) | |
| 1 | L | L | flat surface | $< V_{RS}$ | $\div V_c$ | $\div V_c$ | No |
| 2 | L | L | — | $> V_{RS}$ | $\div V_c$ | $\div V_c$ | Yes |
| 3 | S | S | just before second sensor | $> V_{RS}$ | $\div V_c$ | $< V_{RS}$ | No |

| Sensor Operation | | | | | |
|---|---|---|---|---|---|
| Front Sensor | | | Cabin Sensor | | |
| Actuation | Time | Accuracy in Operation | Actuation | Time | Accuracy in Operation |
| off | — | accurate | off | — | accurate |
| on | in | accurate | on | out | no (delayed inflation) |
| on | — | no (sudden inflation) | off | — | accurate |

(Note: L=large, S=small)

As is apparent from the above table, when the front (second) sensor is used singly, sudden inflation (or discharge) of the safety air bag takes place in accordance with the No. 3 mode, and when the cabin sensor is used singly, the inflation of the safety air bag is insufficient in accordance with the No. 2 mode. When both front (second) and cabin sensors are used in parallel, the sudden discharge takes place in accordance with the No. 3 mode, and if they are used in series, incomplete operation of the safety air bag is resulted in accordance with the No. 2 mode.

In conclusion, no satisfactory result can be obtained, nor practical purpose can be attained with these front (second) and cabin sensors alone.

The present invention is aimed at solving such problems and obtaining improved sensor system by further providing a rear sensor (or first sensor) behind the above-mentioned front sensor (or second sensor).

Figure 3:
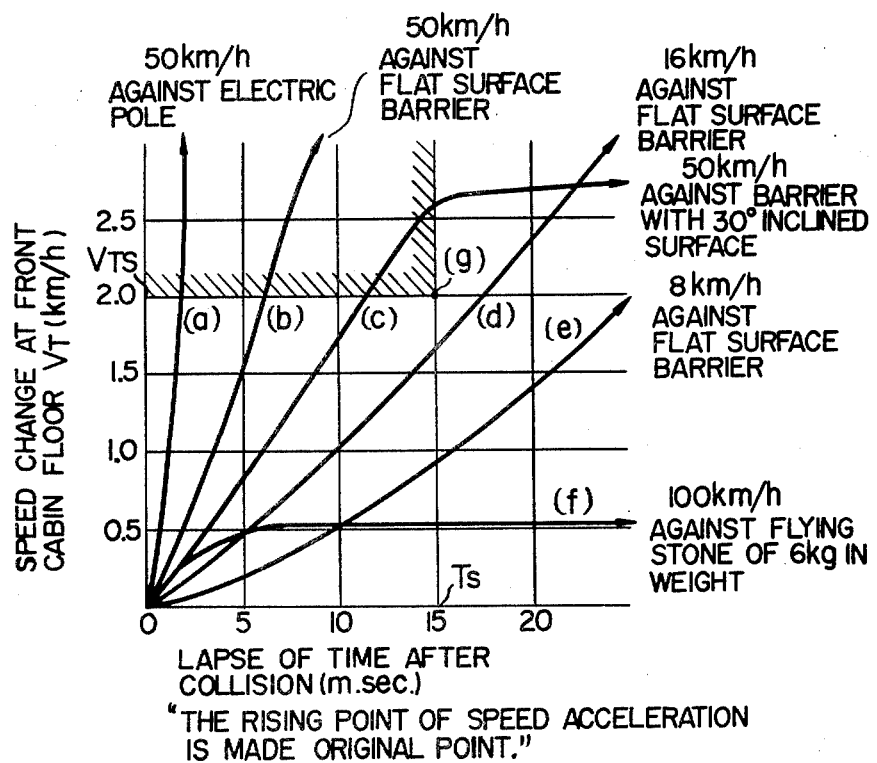
FIG. 3 is a graphical representation showing changes in speed of the front cabin floor of an automotive vehicle with lapse of time after it collides against various experimental objects.

FIG. 3 is a graphical representation showing a time hysteresis of change in the vehicle running speed in the front seat floor of a small-sized automotive vehicle of 800 kg in weight, when it was subjected to collision tests against various objects at various vehicle speed under different conditions.

In the graph, the ordinate represents speed change $V_T$ (km/h) in the front seat floor, and the abscissa denotes time lapse T (m.sec.) after collision. A point $T_S$ on the abscissa represents the ultimate time limit, at which the sensor should give instruction to the safety air bag inflating device to complete its expansion within a required time. This time instant has been experimentally determined at 15 m.sec. On the other hand, another point $V_{TS}$ on the ordinate denotes a speed change at the time of collision within a range of the time lapse $T_S$ at the front seat floor, in case the safety air bag is not inflated, at such a magnitude that the vehicle rider hits himself against the vehicle body with the abovementioned speed reduction value $V_{RS}$.

Accordingly, the graph shows that the safety air bag actuating signal must be generated when the vehicle speed and the time lapse after the collision fall within a hatch-lined zone enclosed by the straight lines showing the $V_{TS}$ and $T_S$ values.

In view of this graphical representation, it is contemplated that a sensor which detects the collision and generates the actuating signal for expanding the safety air bag under the above-described condition be installed in the vicinity of the vehicle cabin so that it may generate the actuating signal when the change in the vehicle speed within a sampling time exceeds the set value, e.g., 2 km/h, with the abovementioned time lapse $T_S$, e.g., 10–15 m.sec. after the collision, being made the sampling time.

FIG. 1 shows one embodiment of the first sensor, in which reference numeral 8 designates an accelerated speed detector to be represented by a seisometric type gauge. The detecting part of this detector is constructed, for example, with a strain gauge, or the like, and an electrical output therefrom is amplified to a certain definite level through a signal conditioner 9, after which it is applied to integration circuits 10, 10', each consisting, for example, of an amplifier 11 (11'), a capacitor C1 (C1'), and a resistor R1 (R1').

A part designated by a reference numeral 12 is a multi-vibrator for generating reset pulses. Outputs Q, $\overline{Q}$ in rectangular waveforms and having a mutually different phase by 180° are applied to the integration circuits 10, 10' through differentiation circuits 13, 13', each consisting, for example, of a capacitor C2 (C2'), a resistor R2 (R2'), and a diode D (D'), with a predetermined lag in phase between them.

The period of the reset pulse in these integration circuits 10, 10' is made equal to the sampling time, i.e., the maximum time delay $T_S$ in detection after the collision takes place, which is permitted to the sensor in order that the safety air bag (or cushion) may display its satisfactory performance, for example, 10 to 15 m.sec.

Those parts designated by reference numerals 14, 14' are comparators. These comparators generate output signals when the integration voltage to be imparted to the input terminals (−) of the integration circuits 10, 10' becomes higher than the established voltage V, V' which have already been imparted to the input terminals (+) of each of the comparators 14, 14' (By this established voltage, a set value for a speed change of, for example, 2 km/h is determined.).

A component part designated by a reference numeral 15 is a "NOR" gate which generates a control signal of a level "H" for actuating the safety air bag at its output terminal, when such output signal from any one of the comparators 14, 14' assumes a level "L".

By providing two units of the integration circuits 10, 10', as stated in the foregoing, in which the resetting timing between them is lagged to a predetermined value, even if an abrupt speed change takes place immediately after any one of the integration circuits 10, 10' is reset, such abrupt change can be detected and integrated by the other integration circuit to prevent any error in detection from occurring without failure, and, at the same time, the integration circuits 10, 10' and the comparators 14, 14' mutually function side by side with the consequence that reliability in the detection becomes increased.

In the illustrated embodiment, explanations have been made with respect to the two-system integration circuit. It may, of course, be possible that the integration circuit consisting of three-system or higher be utilized.

FIG. 2 illustrates various waveforms which show relationship among those output signals from various parts of the first sensor. In these output waveforms, since the phases of the integration circuits 10, 10' are mutually lagged with the outputs Q, $\overline{Q}$ from the multi-vibrator 12 so that they may be reset alternately, the comparator 14' is first actuated with the output from the integration circuit 10, whereby an actuating signal for the safety air bag is generated from the "nor" gate 15 as an output.

By the use of the above-described first sensor, when the values $T_S$ and $V_{TS}$ are established, depending on the automotive vehicle, in which the safety air bag inflating device is to be provided, it becomes possible that the actuating signal for inflating the safety air bag can be generated without any delay in the device operation, even in a small-sized automobile.

In order that operational reliability in the inflating device for the safety air bag may be further improved, the present invention is constructed in such a fashion that the first sensor 1 is provided in the vicinity of the vehicle cabin, and a second sensor 2 which detects the speed change in the automotive vehicle at the initial stage of the collision is provided in the forward position of the first sensor so that the former may function as the back-up sensor. In this construction, the outputs from both first and second sensors 1 and 2 are fed into the "and" gate 3 in FIG. 4 as the input thereto, and, when output signals are generated simultaneously from both sensors 1 and 2, the actuating device (i.e., inflating device) 5 for the safety air bag is actuated through the "and" gate 3 and "or" gate 4, by the actuating signal of which the air bag (not shown) is expanded.

By this construction, even when the first sensor erroneously emits an unnecessary signal at the time of the collision as denoted by the curve d in FIG. 3, the second sensor acts to inhibit actuation of the safety air bag with the result that reliability of the bag inflating device according to the present invention increases. Also, by adopting this safety air bag inflating device according to the present invention, it becomes possible that the safety air bag (or cushion) of this type be installed even if a small-sized automobile.

Depending on the construction of the second sensor 2 and the method of its mounting on the vehicle, and so forth, there might be such an occasion that the signal from the first sensor is emitted upon interruption of the output signal from the second sensor 2. In this case, no actuating signal is emitted.

In order to avoid this situation, there is provided in the circuit a memory device 6 which stores the output signal from the second sensor 2 so that, when the output signals are emitted from both memory device 6 and the first sensor 1 at the same time, the safety air bag may be actuated for inflation, thereby eliminating the above-mentioned disadvantage. For the memory device 6, there may be used a well known flip-flop circuit which receives an output signal from the second sensor 2 to perform an inverting operation, and, while maintaining the inverted state, carries out the signal storing function that the second sensor 2 has become actuated, or a mechanical memory device to be described later.

The forms of collision, as will be apparent from FIG. 3, are innumerable depending on the size, hardness, and so forth of the objects, against which the automotive vehicle collides. Of these various forms of collision, if the collision is of such a type that follows the curves c and d which pass through a point very close to the point g, which is the critical point for the judgement, there arises an apprehension such that no satisfactory reliance can be placed on the safety air bag inflating device. On the other hand, the collision of the type as represented by the curves c and d is smaller in its magnitude and longer in its crush pulse than the collision as represented by the curves a and b, so that the time for judgement may be longer than the sampling time in the first sensor 1.

On the basis of this concept, when a seismometric weight type sensor having no sampling time is used as a cabin sensor 7 for the vehicle, it becomes possible that the safety air bag is accurately inflated with the output from the cabin sensor 7, in such a case where no output can be obtained at the "and" gate 3 due to the first sensor 1 determining the form of collision as represented by the curve c in FIG. 3 to be a "non-actuating" mode of the safety air bag, although the sensing time to be taken is a bit longer.

Figure 6:
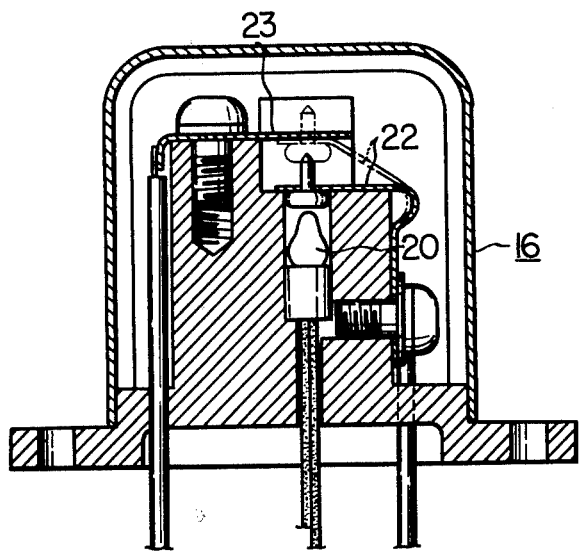
FIG. 6 is a front view in longitudinal cross-section showing one embodiment of a switch mechanism serving also as a memory device to be provided in the circuit shown in FIG. 4.

FIG. 5 is a block diagram showing a modified embodiment of the safety air bag inflating device according to the present invention, in which the "and" gate 3 and the memory circuit 6 in FIG. 4 are replaced with a mechanical switch 16 which also serves as a memory device. At the shock of the collision, when a weight 17 of the second sensor 2 moves rightward against force of a spring 18, a switch 19 is closed to actuate an ignition ball 20. By the actuating pressure of the ignition ball 20, a contact plate 22 of a switch 21 is deformed as shown by a chain line in FIG. 6. By the firm contact of this contact plate 22 to a fixed contact plate 23, the memory-and-switch mechanism 16 memorizes that the second sensor 2 has become actuated. Incidentally, moving coil means may be used in place of the ignition ball.

Figure 7:
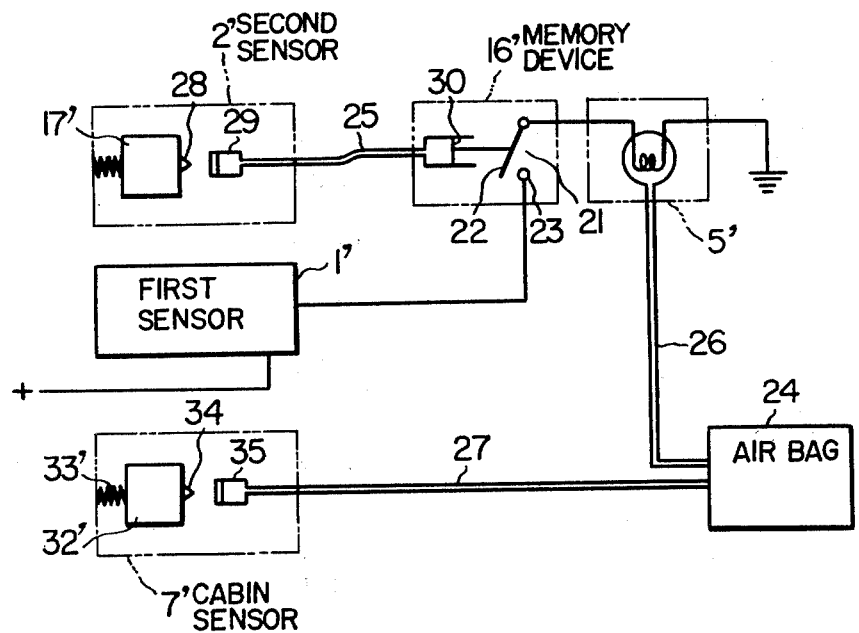
FIG. 7 is a block diagram showing still another embodiment of the inflating device for safety air bag according to the present invention.

FIG. 7 is a block diagram of another modified embodiment, in which no ignition ball 20 is used. The basic construction of this embodiment is such that a second sensor 2' and a memory-and-switch mechanism 16', a safety air bag actuating device 5' and a safety air bag 24, and a cabin sensor 7' and the safety air bag are mutually connected by means of respective detonating tubes 25, 26, and 27, the inside surfaces of which are coated with an explosive material.

At the time of collision, a striker 28 hits the detonating material 29 by the movement of the weight 17' to cause the explosive material within the detonating tube 25 to explode, thereby actuating a piston 30 at the tip end thereof to close the switch 30. In this state, when an output signal is emitted from the first sensor 1', the safety air bag actuating device 5' becomes actuated to cause the explsoive material within the detonating tube 26 to explode, thereby expanding the safety air bag 24.

Also, when a weight 32' of the cabin sensor 7' is actuated against a spring 33' and the striker 34 hits the detonating material 35, the explosive within the detonating tube 27 is exploded to thereby expand the safety air bag 24.

Although the present invention has been described in the foregoing in reference to a few preferred embodiments thereof, it should be understood that these embodiments are merely illustrative and not so restrictive, and that any person of ordinary skill in the art may make any changes and modifications within the purview of the present invention as recited in the appended claims.

What is claimed is:

1. A device for inflating a safety air bag in an automotive vehicle which comprises in combination:
    (a) means for inflating said air bag;
    (b) first sensor means which is installed in the neighborhood of a cabin of the automotive vehicle, and which generates an actuating signal when a change in the running speed of the vehicle within a sampling time exceeds a predetermined value, said sampling time being the maximum delay in detection time permitted to said sensor means to impart the actuating signal to said air bag inflating means after vehicle collision takes place so that the safety air bag may exhibit satisfactory performance to protect the vehicle riders from unexpected danger of accident, said first sensor being composed of:
    1. an accelerated speed detector;
    2. a signal conditioner connected in series with said detector and for amplifying an output signal from said detector to a certain definite level;
    3. a plurality of integration circuits to receive the amplifier signals from said signal conditioner, each said integration circuit being composed of an amplifier, a capacitor, and a resistor;
    4. a plurality of differentiation circuits, each being composed of a capacitor, a resistor, and a diode;
    5. a multi-vibrator for generating reset pulses, outputs therefrom in rectangular waveforms being applied to each of said integration circuits through each of said differentiation circuits with a predetermined lag in phase between them;
6. a plurality of comparators for generating output signals when an integration voltage to be imparted to the input terminals (−) of said integration circuits becomes higher than established voltages which have already been imparted to the input terminals (+) of each of the comparators; and
7. "NOR" gate circuit for generating, at the output terminal thereof, a control signal of a predetermined level to actuate the safety air bag actuating means, when such output signal from any one of said comparators assumes a certain definite level;

(c) second sensor means which is installed in front of said first sensor means, and which detects the change in the vehicle speed at the intial stage of collision;
(d) third sensor means which is installed in said vehicle cabin, said sensor having no sampling time relative to a predetermined speed reduction value in the vehicle; and
(e) memory means to store therein an output from said second sensor means, said air bag inflating means being actuated, upon collision, in response to either the presence of both said control signal generated from said "NOR" gate circuit in said first sensor means and the stored output from said second sensor, or only said third sensor.

* * * * *